United States Patent
Yang

(10) Patent No.: US 7,054,468 B2
(45) Date of Patent: May 30, 2006

(54) FACE RECOGNITION USING KERNEL FISHERFACES

(75) Inventor: Ming-Hsuan Yang, San Jose, CA (US)

(73) Assignee: Honda Motor Co., Ltd., Tokyo (JP)

( * ) Notice: Subject to any disclaimer, the term of this patent is extended or adjusted under 35 U.S.C. 154(b) by 718 days.

(21) Appl. No.: 10/201,429

(22) Filed: Jul. 22, 2002

(65) Prior Publication Data

US 2004/0017932 A1    Jan. 29, 2004

Related U.S. Application Data

(60) Provisional application No. 60/337,022, filed on Dec. 3, 2001, provisional application No. 60/336,947, filed on Dec. 3, 2001.

(51) Int. Cl.
*G06K 9/00* (2006.01)

(52) U.S. Cl. ............... 382/118; 382/190; 382/253; 382/276; 345/16; 345/427

(58) Field of Classification Search ............... 382/115, 382/118, 181, 190, 225, 253, 232, 156, 224, 382/276; 348/699; 345/16, 419, 424, 427
See application file for complete search history.

(56) References Cited

U.S. PATENT DOCUMENTS

| 5,164,992 A | 11/1992 | Turk et al. |
| 5,710,833 A | 1/1998 | Moghaddam et al. |
| 5,719,951 A * | 2/1998 | Shackleton et al. ......... 382/118 |
| 5,842,194 A * | 11/1998 | Arbuckle ...................... 706/52 |
| RE36,041 E | 1/1999 | Turk et al. |
| 6,038,337 A * | 3/2000 | Lawrence et al. .......... 382/156 |
| 6,112,195 A | 8/2000 | Burges |
| 6,826,300 B1 * | 11/2004 | Liu et al. ..................... 382/159 |
| 6,920,231 B1 * | 7/2005 | Griffin ........................ 382/115 |

OTHER PUBLICATIONS

Sebastian Mika et al., "Fisher Discriminant Analysis With Kernels", Proceedings of IEEE, Neural Networks for Signal Processing Workshop 1999, 8 Pages.*

Adini, Yael et al., "Face Recognition: The Problem of Compensating for Changes in Illumination Direction," IEEE Transactions on Pattern Analysis and Machine Intelligence (Jul. 1997), vol. 19, No. 7, pp. 721-732.

(Continued)

*Primary Examiner*—Sheela Chawan
(74) *Attorney, Agent, or Firm*—Fenwick & West LLP

(57) ABSTRACT

A face recognition system and method project an input face image and a set of reference face images from an input space to a high dimensional feature space in order to obtain more representative features of the face images. The Kernel Fisherfaces of the input face image and the reference face images are calculated, and are used to project the input face image and the reference face images to a face image space lower in dimension than the input space and the high dimensional feature space. The input face image and the reference face images are represented as points in the face image space, and the distance between the input face point and each of the reference image points are used to determine whether or not the input face image resembles a particular face image of the reference face images.

45 Claims, 7 Drawing Sheets

OTHER PUBLICATIONS

Bartlett, Marian Stewart, "Face Image Analysis by Unsupervised Learning and Redundancy Reduction," Doctorial Dissertation, at University of California at San Diego (1998).

Bartlett, Marian Stewart et al., "Independent Component Representations for Face Recognition," Proceedings of the SPIE Symposium on Electronic Imaging: Science and Technology; Conference on Human Vision and Electronic Imaging III, San Jose, CA (Jan. 1998), pp. 528-539.

Bartlett, Marian Stewart et al., "Viewpoint Invariant Face Recognition Using Independent Component Analysis and Attractor Networks," Advances in Neural Information Processing Systems (1997), vol. 9, pp. 817-823.

Baudat, G. et al., "Generalized Discriminant Analysis Using A Kernel Approach," Neural Computation (2000), vol. 12, pp. 2385-2404.

Belhumeur, Peter N. et al., "Eigenfaces vs. Fisherfaces: Recognition Using Class Specific Linear Projection," IEEE Transactions on Pattern Analysis and Machine Intelligence (Jul. 1997), vol. 19, No. 7, pp. 711-720.

Bell, Anthony J. et al., "An Information-Maximisation Approach To Blind Separation and Blind Deconvolution," Neural Computation (1995), vol. 7. No. 6, pp. 1004-1034.

Bishop, Christopher M. et al., "Non-linear Bayesian Image Modelling," Proceedings of the Sixth European Conference on Computer Vision (2000), vol. 1, pp. 3-17.

Frey, Brendan J. et al., "Mixtures of Local Linear Subspaces for Face Recognition," Proceedings of the IEEE Conference on Computer Vision and Pattern Recognition (Jun. 1998), pp. 32-37.

Hyvärinen, Aapo et al., "A Fast Fixed-Point Algorithm for Independent Component Analysis," Neural Computation (1997), vol. 9, No. 7, pp. 1483-1492.

Li, Yongmin et al., "Dynamic Face Recognition Using Identity Surfaces," [online], [retrieved on Mar. 11, 2002]. Retrieved from the Internet:<URL: http://www.dai.ed.ac.uk/Cvonline/Local_Copies/LI1/idsurf/>.

Li, Yongmin et al., "Extracting Discriminant Features of Faces Using Kernel Discriminant Analysis," [online] [retrieved on Mar. 11, 2002]. Retrieved from the Internet:<URL: http://www.dcs.qmul.ac.uk/~yongmin/kda/index.html>.

Liu, Chengjun et al., "Evolutionary Pursuit and Its Application to Face Recognition," IEEE Transactions of Pattern Analysis and Machine Intelligence (Jun. 2000), vol. 22, No. 6, pp. 570-582.

Martinez, Aleix M. et al., "PCA versus LDA," IEEE Transactions on Pattern Analysis and Machine Intelligence (Feb. 2001), vol. 23, No. 2, pp. 228-233.

Mika, Sebastian et al., "Invariant Feature Extraction and Classification in Kernel Spaces," Advances in Neural Information Processing Systems (2000), vol. 12, pp. 526-532.

Moghaddam, Baback, "Principal Manifolds and Bayesian Subspaces for Visual Recognition," Proceedings of the Seventh IEEE International Conference on Computer Vision (1999), pp. 1131-1136.

Moghaddam, Baback et al., "Probabilistic Visual Learning for Object Representation," IEEE Transactions on Pattern Analysis and Machine Intelligence (Jul. 1997), vol. 19, No. 7, pp. 696-710.

Phillips, P. Jonathon, "Support Vector Machines Applied to Face Recognition," Advances in Neural Information Processing Systems (1998), vol. 11, pp. 803-809.

Phillips, P. Jonathon et al., "The FERET Evaluation Methodology for Face-Recognition Algorithms," IEEE Transactions on Pattern Analysis and Machine Intelligence (Oct. 2000), vol. 22, No. 10, pp. 1090-1104.

Platt, John C., et al., "Large Margin DAGs for Multiclass Classification," Advances in Neural Information Processing Systems (2000), vol. 12, pp. 547-553.

Roth, Volker et al., "Nonlinear Discriminant Analysis Using Kernel Functions," Advances in Neural Information Processing Systems (2000), vol. 12, pp. 568-574.

Roweis, Sam T. et al., "Nonlinear Dimensionality Reduction by Locally Linear Embedding," Science (Dec. 2000), vol. 290, pp. 2323-2326.

Schölkopf, Bernhard, et al., "Kernel Principal Component Analysis," Advances in Kernel Methods—Support Vector Learning, MIT Press (1999), pp. 327-352.

Schölkopf, Bernhard et al., "Nonlinear Component Analysis As A Kernel Eigenvalue Problem," Neural Computation (1998), vol. 10, pp. 1299-1319.

Swets, Daniel L. et al., "Hierarchical Discriminant Analysis for Image Retrieval," IEEE Transactions on Pattern Analysis and Machine Intelligence (May 1999), vol. 21, No. 5, pp. 386-401.

Teh, Yee Whye et al., "Rate-coded Restricted Boltzmann Machines for Face Recognition," Advances in Neural Information Processing Systems (2001), vol. 13, pp. 908-914.

Tenenbaum, Joshua B. et al., "A Global Geometric Framework for Nonlinear Dimensionality Reduction," Science (Dec. 2000), vol. 290, pp. 2319-2323.

Weston, J. et al., "Feature Selection for SVMs," Proceedings of the Advances in Neural Information Processing Systems (2001), vol. 13, pp. 668-674.

Yang, Ming-Hsuan, et al., "Face Recognition Using Kernel Eigenfaces," Proceedings of the IEEE International Conference on Image Processing (Sep. 2000), Vancouver, Canada, vol. 1, pp. 37-40.

Zhao, W. et al., "Discriminant Analysis of Principal Components for Face Recognition," Third International Conference on Automatic Face and Gesture Recognition (1998), pp. 336-341.

Schölkopf, Bernhard, et al., "Input Space Versus Feature Space in Kernel-Based Methods," IEEE Transactions on Neural Networks (Sep. 1999), vol. 10, No. 5, pp. 1000-1017.

International Search Report Dated Mar. 4, 2003 for International Application No. PCT/JP02/12649, filed on Dec. 3, 2002.

Mika, Sebastian, et al., "Fisher Discriminant Analysis With Kernels," Proceedings of IEEE Neural Networks for Signal Processing Workshop 1999, 8 pages.

Written Opinion from International Preliminary Examining Authority dated Aug. 26, 2003 for International Application No. PCT/JP02/12649 filed on Dec. 3, 2002.

Mika, Sebastian, et al., "*A Mathematical Programming Approach to the Kernel Fisher Algorithm*," Advances in Neural Information Processing Systems (2001), vol. 13, pp. 591-597.

International Search Report dated Aug. 26, 2003 for International Application No. PCT/JP03/09534 filed on Jul. 28, 2003.

\* cited by examiner

Set of Reference Face Images ~102

Face Recognition System ~104

Input Face Image ~106

Face Recognition System ~104

Recognition of Input Face Image Among Reference Face Images ~108

FACE RECOGNITION USING KERNEL FISHERFACES

CROSS-REFERENCE TO RELATED APPLICATIONS

This application claims priority under 35 U.S.C. §119(e) to co-pending U.S. Provisional Patent Application No. 60/336,947, entitled "Kernel Methods for Face Recognition," filed on Dec. 3, 2001, and to co-pending U.S. Provisional Patent Application No. 60/337,022, entitled "Face Recognition Using Kernel Methods," filed on Dec. 3, 2001, the subject matters of which are incorporated by reference herein in their entirety.

TECHNICAL FIELD

The present invention relates generally to face recognition and, more specifically, to face recognition using Kernel Fisher Linear Discriminant analysis or Kernel Fisherfaces.

BACKGROUND OF THE INVENTION

Face recognition technology has received increased attention lately, since it can be used in various applications such as surveillance, security, advertising, and the like. However, previous attempts to develop efficient face recognition systems were not successful because the computers and algorithms used in previous face recognition systems could not effectively handle the huge amount of data and complicated computation inherently involved in face recognition. These previous attempts typically utilized simple feature representations that do not account for intrinsic structure information in face images. Such intrinsic structure information can only be encoded by using advanced methods such as higher order statistics. Furthermore, previous face recognition systems did not work well when the face images are illuminated under different lighting conditions.

Recently, linear subspace methods such as Principal Component Analysis ("PCA") and Fisher Linear Discriminant ("FLD") have been applied to face recognition with impressive results. PCA and FLD utilize the basic eigenvalue problem in face recognition and hence induce a lower dimensional representation of the face images from their image samples in the input space. In this manner, PCA and FLD reduce the amount of data and hence alleviate the computational burden in face recognition.

One example of a face recognition system using PCA is disclosed in U.S. Pat. No. Re. 36,041 to Turk et al. that is incorporated by reference herein in its entirety. Here, the face recognition system utilizes PCA to obtain a representation of the face images in a multi-dimensional space lower in dimension than the input space. The use of PCA enables reduction of the amount of data and the computational burden of face recognition.

One of the disadvantages of PCA and FLD is that the lower dimensional representation of the face images has no information regarding the relationship between the pixels in the image except the relative position between the pixels. That is, the lower dimensional representations in PCA or FLD are based on second order statistics of the images, i.e., pixelwise covariance among the pixels, and do not address higher order statistical dependencies such as the relationships among three or more pixels. Such higher order dependencies in a face image may include relations among pixel intensity values, such as the relations among three or more pixels in an edge or curve. The higher order dependencies often have more meaningful, representative features of the face image and may capture important information for face recognition. One of the reasons why PCA and FLD do not use higher order statistical dependencies is that it results in a tremendous computational burden.

Some research has been done to use higher order statistical dependencies in the machine learning area. However, the input data used in machine learning is quite different from the face image data used in face recognition. First, data in machine learning is relatively clean (without much noise) and have low dimensionality, i.e., each sample or data point is typically a short vector with less than 200 elements. Alternatively, the variations of face images are large, which is one of the reasons why face recognition is difficult to implement. Second, the samples in face recognition have dimensionality much higher than machine learning, which results in an enormous amount of data and computational burden in face recognition. For example, a typical 50×50 pixel face image has 2500 elements in each sample. For these reasons, the algorithm and mathematics involved in using higher order statistical dependencies in the machine learning area are inherently different from those used in face recognition. Therefore, the algorithm and mathematics for using higher order statistical dependencies in the machine learning area is not applicable to face recognition.

Therefore, it is necessary to have a face recognition system and method that can process face image data having wide variations and an enormous amount of image data such that higher order dependencies of the face image can be used to obtain more representative features of the face image without introducing a huge computational burden on the face recognition system. In addition, what is needed is a face recognition system that utilizes the discriminant features of the face images and maximizes the class separation when these features are projected to a lower dimensional face image space.

SUMMARY OF INVENTION

The present invention provides a face recognition system and method utilizing both the more representative and discriminant features of the face images without introducing a huge computational burden. The face recognition system projects an input face image and a set of reference face images from an input space to a high dimensional feature space in order to obtain more representative features of the face images. The Kernel Fisherfaces of the reference face images are calculated, and are used to project the input face image and the reference face images to a face image space lower in dimension than the input space and the high dimensional feature space. In this manner, the representative and discriminating features of the face images are obtained and can be used in face recognition without resulting in a serious computational burden.

Upon projection using the Kernel Fisherfaces, the input face image and the reference face images are represented by vectors in the lower dimensional face image space. The distances between the input face image point and each of the reference face image points are calculated. The face recognition system and method of the present invention determine the shortest of the computed distances. As a result, it is determined that the input face image resembles a particular face image represented by one of the reference image points corresponding to the shortest distance in the face image space when the computed shortest distance is shorter than a threshold.

By using the Kernel Fisher Linear Discriminants (Kernel Fisherfaces) in face recognition, it is possible to simplify the computation involved in using the higher order dependencies among pixels and the discriminating features in the images while obtaining and utilizing the more representative and discriminative features of the face images in face recognition.

The present invention may be embodied in various forms, including computer program products, methods, and systems, special or general purpose computing devices or apparatuses, online services or systems, users interfaces, etc.

BRIEF DESCRIPTION OF THE DRAWINGS

The teachings of the present invention can be readily understood by considering the following detailed description in conjunction with the accompanying drawings. Like reference numerals are used for like elements in the accompanying drawings.

DETAILED DESCRIPTION OF EMBODIMENTS

Figure 1A:
FIG. 1A is a diagram illustrating the training of the face recognition system using a set of reference face images according to one embodiment of the present invention.

FIG. 1A is a diagram illustrating that the face recognition system the training of the face recognition system using a set of reference face images according to one embodiment of the present invention. Referring to FIG. 1A, a set of reference face images 102 is input to the face recognition system 104. The reference face images 102 are the face images to which an input face image will be compared later for face recognition. The face recognition system 104 analyzes and is trained with the image data of the reference face images 102 in a manner that is explained in detail below so that the face recognition system 104 can later determine that an input face image resembles one of the reference face images 102.

Figure 1B:
FIG. 1B is a diagram illustrating the recognition of a particular input face among the set of reference face images according to one embodiment of the present invention.
Figure 1B:

FIG. 1B is a diagram illustrating that the face recognition system recognizes an input face image as resembling a particular face image among the set of reference face images according to one embodiment of the present invention. The face recognition system 104 has been trained with the set of reference face images as shown in FIG. 1A. Referring to FIG. 1B, an input face image 106 is received by the face recognition system 104. The face recognition system 104 determines whether or not the input face image 106 resembles one of the face images in the set of reference face images 102 and also particularly which face image it resembles This result 108 is output from the face recognition system 104.

Figure 1C:
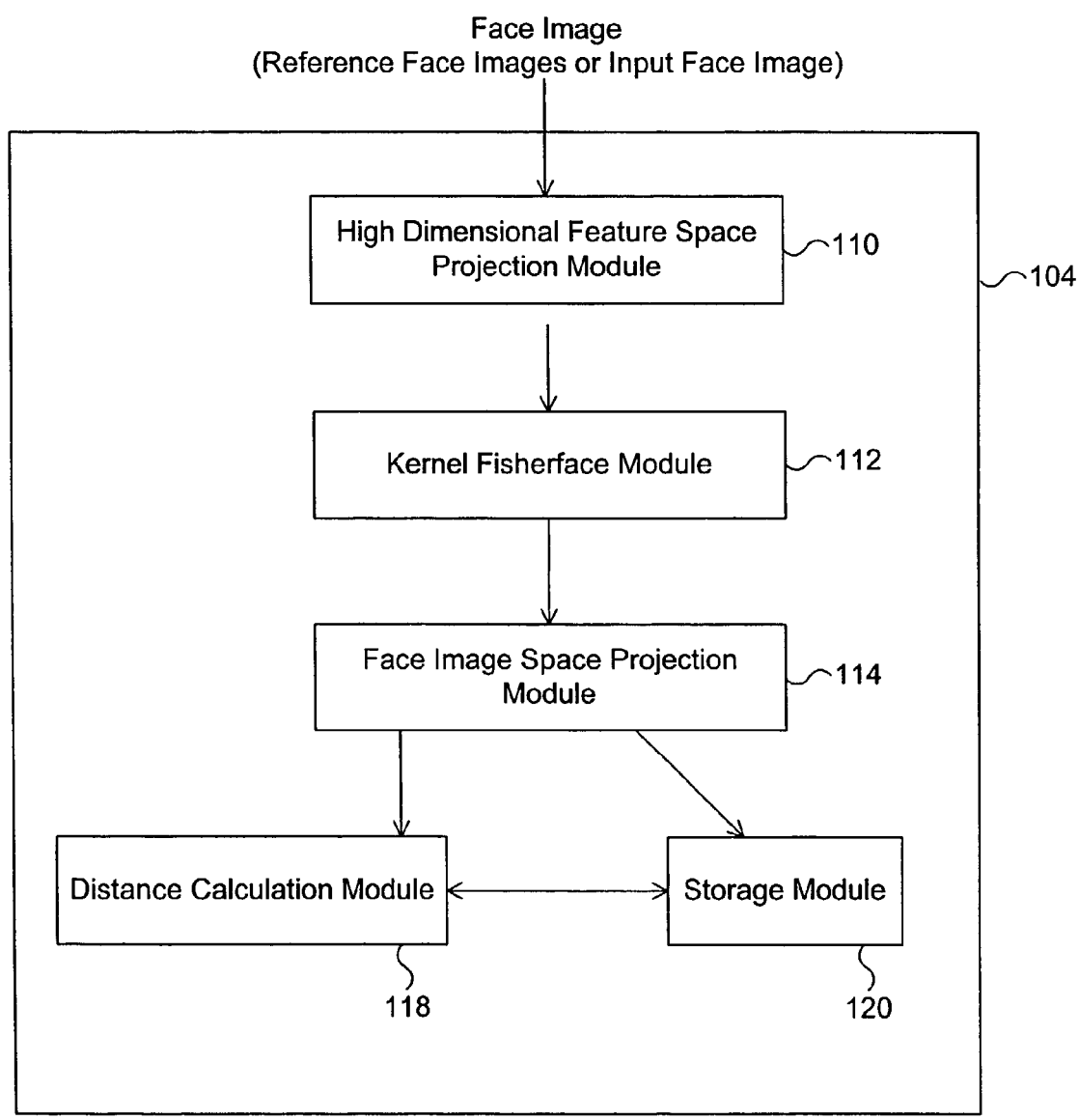
FIG. 1C is a block diagram illustrating the structure of the face recognition system 104 illustrated in FIGS. 1A and 1B according to one embodiment of the present invention.

FIG. 1C is a block diagram illustrating the structure of the face recognition system 104 illustrated in FIGS. 1A and 1B according to one embodiment of the present invention. Referring to FIG. 1C, the face recognition system 104 includes a high dimensional projection module 110, a Kernel Fisherface calculation module 112, a face image space projection module 114, a distance calculation module 118, and a storage module 120. The high dimensional projection module 110 projects face images (the set of reference images 102 or input face image 106) from the input space to a high dimensional feature space in order to obtain more representative features from the higher order statistics of the projected reference face images 102 or input face image 106. The high dimensional feature space has more dimensions than the input space. The projection of the face images to the high dimensional feature space is carried out by performing a variety of operations between vectors representing the face images using a projection function. The Kernel Fisherface module 112 calculates the eigenvalues and eigenvectors (Kernel Fisherfaces) of the projected reference face images 102 in the high dimensional feature space. The face image space projection module 118 obtains a face image space representation of the reference face images 102 or input face image 106 by projecting the face images from the high dimensional feature space to a lower dimensional face image space using the calculated Kernel Fisherfaces. The dimension of the face image space is typically lower than the input space and the high dimensional feature space for most face recognition image samples.

The storage module 120 stores the representation of the reference face images 102 in the lower dimensional face image space for use in comparison to input face images 106. The storage module 120 also stores the computed Kernel Fisherfaces for use with input face images. The distance calculation module 118 calculates the distances between the point corresponding to the input face image 106 in the face image space and each point corresponding to the reference face images 102 in the face image space and determines which distance is the shortest in order to identify particularly which reference face image 102 the input face image 106 resembles. According to one embodiment of the present invention, the calculated distance is a Euclidean distance. However, other types of distances can be used consistent with the present invention. The details of the mathematics and algorithm associated with the various modules in the face recognition system 104 is explained in detail below.

Figure 1D:
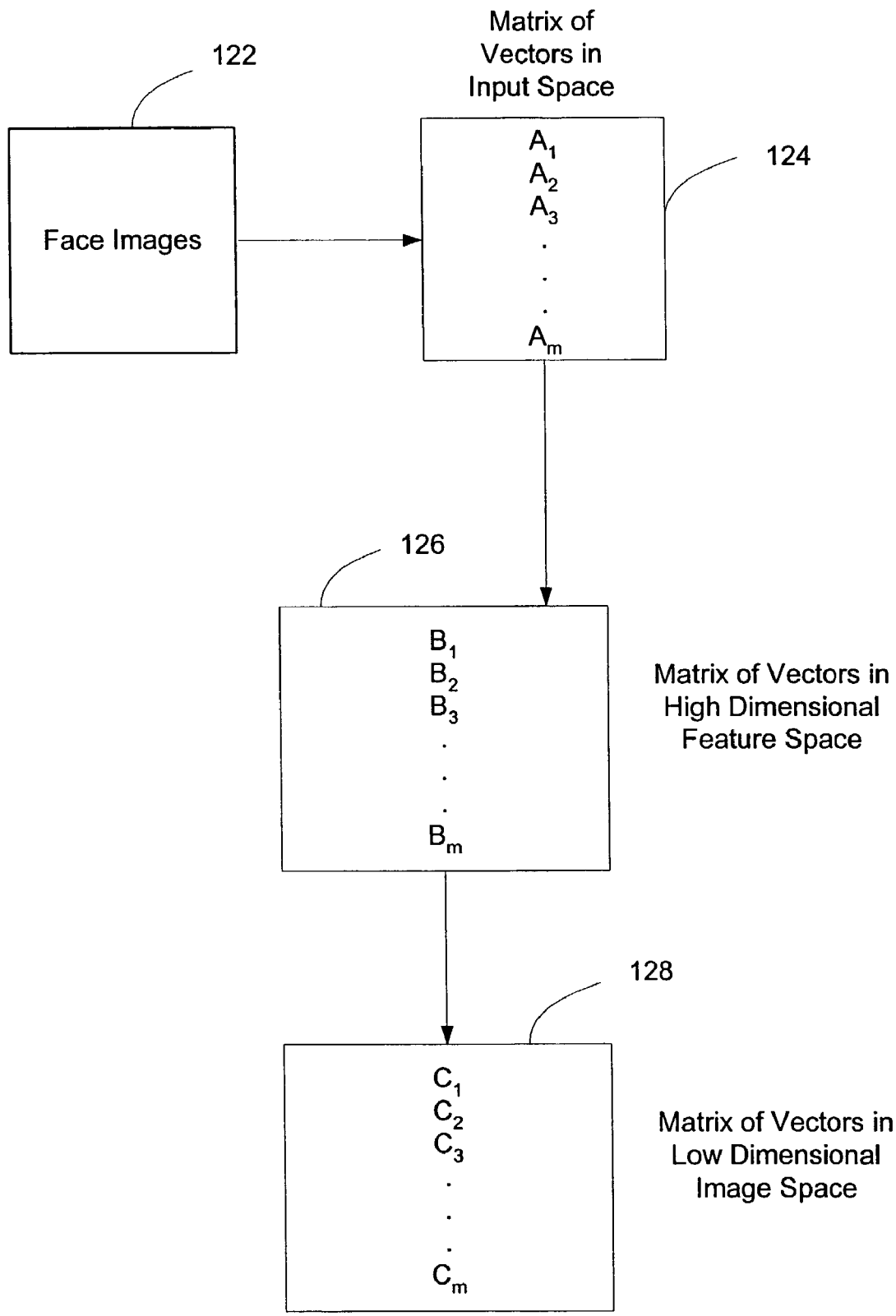
FIG. 1D is a diagram illustrating how the face images are represented as a matrix of vectors and how those vectors are modified in the face recognition system 104 according to one embodiment of the present invention.

FIG. 1D is a diagram illustrating how the face images are represented as a matrix of vectors and how those vectors are modified in the face recognition system 104 according to one embodiment of the present invention. First, each face image (reference face images or input face image) is represented by a vector, and a set of face images 122 is represented by a matrix of vectors 124 in the input space. Typically, a face image is a two-dimensional N by N array of intensity values. Let n be equal to $N^2$. Each face image is represented in the input space as one of vectors $A_1$, $A_2$, $A_3$, ..., $A_m$ in the matrix 124, each having a dimension n, where m is equal to the number of face images represented by the matrix of vectors and n is equal to $N^2$. In other words, the matrix 124 has m rows and n columns. For example, assume that 400 images of 40 subjects are used in the face recognition system and that the resolution of the images are 23×23. Then, m equals 400 and n equals 529 (23×23).

The face recognition system 104 of the present invention projects the matrix 124 of vectors in the input space to a high dimensional feature space to extract more representative features of the face images from the higher order statistics among the pixels in the images, resulting in a matrix 126 of vectors $B_1, B_2, B_3, \ldots, B_m$ in the high dimensional feature space. The vectors $B_1, B_2, B_3, \ldots, B_m$ are created as a result of various operations among the vectors $A_1, A_2, A_3, \ldots, A_m$ according to a projection function and have a higher dimension than the vectors $A_1, A_2, A_3, \ldots, A_m$. In other words, the matrix 126 has m rows and f columns, where f is much larger than n (i.e., the number of columns in matrix 124). The number of columns f depends on the selected projection function.

Then, the face recognition system 104 projects the matrix 126 of vectors to a low dimensional face image space that is lower in dimension than the high dimensional feature space and also typically lower in dimension than the input space, resulting in a matrix 128 of vectors $C_1, C_2, C_3, \ldots, C_m$ in a low dimensional image space. The computation involved in this process is simplified by use of Kernel Fisherfaces, as described in detail below. The vectors $C_1, C_2, C_3, \ldots, C_m$ typically have dimensions lower than the dimensions of the vectors $A_1, A_2, A_3, \ldots, A_m$ and vectors $B_1, B_2, B_3, \ldots, B_p$. In other words, the matrix 128 has m rows and d columns, where d is much less than n and f (i.e., the number of columns in matrices 124 and 126, respectively) and typically has a value equal to the number of subjects in the face images subtracted by 1. In the above example, d is equal to 39 (40−1).

Figure 2:
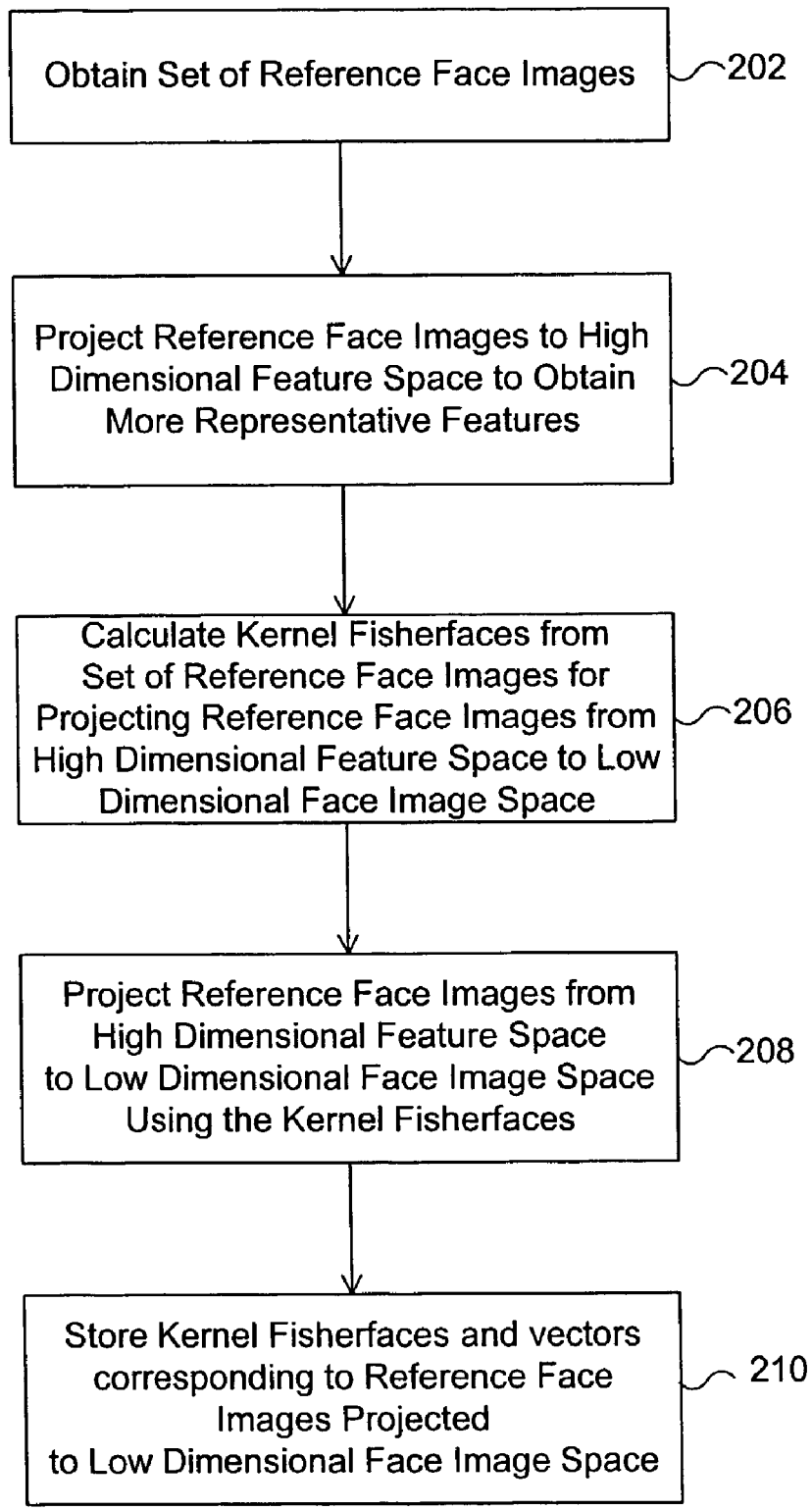
FIG. 2 is a flowchart illustrating the method of training the face recognition system with a set of reference face images according to one embodiment of the present invention.

FIG. 2 is a flowchart illustrating the method of training the face recognition system 104 with a set of reference face images according to one embodiment of the present invention. Referring to FIG. 2, a set of reference face images is obtained 202. Initially, the reference face images are comprised of a matrix of intensity values for each pixel. To this end, the reference face images are collected for each person using a variety of facial expressions and under varying lighting conditions. In other words, for each person a set of images is collected with lighting and expression variation. Then, conventional image processing is carried out to align the elements such as the eyes and nose in each reference face image, and each reference face image is labeled with class identities. That is, each set of face images is labeled with an identifier (e.g., a number) which reflects the identity of the person's image. For example, a set of 15 face images for John is collected and each face image is labeled with class number 1. Similarly, a set of 15 face images for Jane is collected and each face image is labeled with class number 2, and so on. These face images are used as reference images for face recognition. Then, each reference face image is represented with a raster scan of the intensity values in the form of a vector, and the set of reference face images can be represented in the form of a matrix including a plurality of vectors. For example, each of the 10,000 pixels in a 100×100 pixel-face image is traversed by row and the intensity value of each pixel (ranging from 0 to 255) is put in the form of a 1×10,000 vector. The resulting matrix is in the form of an m×10000 matrix, where m is the number of reference face images. The method of obtaining a face image in the form of input vectors is disclosed in detail in U.S. Pat. No. Re. 36,041 to Turk et al., the subject matter of which is incorporated in its entirety herein.

Subsequently, the reference face images 102 are projected 204 to a high dimensional feature space that is higher in dimension than the input space by the high dimensional projection module 110 in order to obtain more representative features of the images. These more representative features can be derived from the higher order statistical dependencies in the images such as the relationships among three or more pixels. As stated previously, such higher order dependencies in an image may include relations among the pixel intensity values, such as the relations among three or more pixels in an edge or curve.

This is in contrast to conventional face recognition systems such as those disclosed in U.S. Pat. No. Re. 36,041 to Turk et al. where higher order dependencies in an image are not used but rather a covariance matrix is utilized to encode the relationship between face images. The covariance matrix in conventional face recognition systems is based on second order statistics, i.e., pair-wise multiplication of pixel values (taking every two pixels into account), whereas the projection module 204 allows multiplication of more than two pixel values, thereby computing higher order statistics among the pixels (more than two pixels). Such higher order statistics can often capture the intrinsic relationships among three or more pixels in an edge or cure. The higher order dependencies often have more meaningful, representative features of the image and capture important information for face recognition compared to second order statistics. This is because second order statistics correspond to the amplitude spectrum of an image whereas higher order statistics correspond to phase spectrum. Phase spectrum captures structure information and provides meaningful representation of a face image.

Projection of the reference face images 102 to a high dimensional feature space can be achieved by performing various types of operations among the vectors representing the reference face images based upon a projection function. For example, the following projection function can be used to project a vector in a two-dimensional space to a three-dimensional feature space:

$$\Phi: R^2 \rightarrow R^3$$

$$(x_1, x_2) \rightarrow (x_1^2, x_2^2, \sqrt{2}x_1x_2)$$

Similarly, the following projection function can be used to project a vector in two-dimensional space to a four-dimensional feature space:

$$\Phi: R^2 \rightarrow R^4$$

$$(x_1, x_2) \rightarrow (x_1^2, x_2^2, x_1x_2, x_2x_1)$$

It is possible to project an n-dimensional face image to an f-dimensional feature space (f being much larger than n) using other various projection functions. Selection of a specific projection function is dependent upon data and application and is often empirically determined.

Numerous forms of projection functions $\Phi(x)$ can be used for the present invention. However, there are only a limited number of projection functions that are compatible with efficient and systematic computation. One approach for selecting a particular projection function $\Phi(x)$ is to select a projection function of which the dot product can be computed efficiently using a kernel function rather than by actually performing the dot product operation of the projection functions, since dot product operations of the projection functions are used frequently in the computation carried out for projecting the face images from the high dimensional feature space to the low dimensional face image space and computationally intense. Thus, such approach finds kernel functions k(x,y) that satisfy the following relation:

$$k(x, y) = \Phi(x) \cdot \Phi(y)$$

Typically, computations using the kernel function k(x,y) can be carried out much more efficiently compared to computations using the dot product $\Phi(x) \cdot \Phi(y)$, because the computation using the kernel function k(x,y) depends on the n-dimensional input space (usually low) whereas the computation of $\Phi(x) \cdot \Phi(y)$ depends on the dimensionality of $\Phi(x)$ and $\Phi(y)$, which is usually very high and can be infinite.

Mercer's condition (also known as Mercer's theorem) is known in the art as a method of determining whether a certain kernel function k(x,y) can be used to compute the dot products of the projected samples ($\Phi(x) \cdot \Phi(y)$) in the input space rather than in the high dimensional feature space. However, the projection functions can be selected according to any other method or theorem (even empirically). Mercer's theorem is well-known to a person skilled in the art and is explained in detail in Christopher J. C. Burges, "A Tutorial on Support Vector Machines for Pattern Recognition," Data Mining and Knowledge Discovery, vol. 2, no. 2, pp. 121–167 (1998).

There are about two dozens of kernel functions satisfying the Mercer's condition. The polynomial kernel $(k(x, y) = (x \cdot y)^d)$ and the Gaussian kernel $(k(x, y) = e^{-\|x-y\|^2 / 2\sigma^2}$, where $\sigma$ is the standard deviation of the Gaussian distribution from which x and y come from) are the most widely used kernel functions. According to one embodiment of the present invention, the second degree (d=2) polynomial kernel is used as the projection function. According to another embodiment of the present invention, third degree (d=3) polynomial kernel is used as the projection function. Note that the exact form of the projection functions ($\Phi(x),\Phi(y)$) is completely dictated by the selected kernel function k(x,y). In fact, the exact closed forms of the projection functions need not be known if only the dot products of the projected samples, $\Phi(x) \cdot \Phi(y)$ are used in the computation for projecting the face images from the high dimensional feature space to the lower dimensional face image space, since the kernel function k(x,y) can be used instead to perform such projection in an computationally efficient way. Thus, one advantage of using kernel functions is that an n-dimensional face image can be projected to an f-dimensional feature space (f is much larger than n), which provides a richer feature representation, without knowing the exact closed form of the projection function. When the d-degree polynomial kernel function is used, the dimensionality f of the high dimensional feature space is $$\binom{d+n-1}{d}.$$

For example, for a degree d=2 polynomial kernel and face image consisting of 16 by 16 pixels (n=256), the dimensionality f of the high dimensional feature space is 32,896 (more than 128 times larger than the dimensionality of the input space).

The reasons for using such projection functions to project face images from an input space to a high dimensional feature space are multi-fold. First, face images projected to a higher dimensional feature space provide a more expressive feature representation than face images in the original input space. The projection functions compute various statistics to represent the patterns, which is important since a more expressive feature representation often facilitates pattern classification tasks. Second, projection functions allow nonlinear representation among features in a pattern. For example, the above-mentioned examples of projection functions account for the relationship among the features in a pattern. Third, projection functions allow classification tasks to be performed in a higher dimensional space, which makes the classification task easier. In other words, patterns that are not linearly separable in the input space can usually be linearly separated in a high dimensional feature space.

Referring to FIG. 2 again, the Kernel Fisherface calculation module 112 calculates 206 the Kernel Fisherfaces from the projected reference face images in the high dimensional feature space. The techniques involved in calculating the Kernel Fisherfaces will be described in detail below.

The reference face images are projected 208 from the high dimensional feature space to the low dimensional face image space by the face image space projection module 114 using the calculated Kernel Fisherfaces, resulting in corresponding vectors in the low dimensional face image space. Images of faces, being similar in overall configuration, are not randomly distributed in the high dimensional feature space and thus can be described by a relatively low dimensional subspace. The Kernel Fisherfaces can simplify the calculation involved in deriving a description of the face images in the low dimensional face image space from the projected reference images in the high dimensional feature space. The dimension of the lower dimensional face image space is typically lower than the dimensions of both the input space and the high dimensional feature space to which the input face images were projected.

Subsequently, the Kernel Fisherfaces and the distribution of vectors corresponding to the reference face images in the low dimensional face image space is stored 210 in the storage module 120 for future use in comparison with an input face image. Thus, the storage module 120 will have a distribution of vectors in the face image space corresponding to the set of reference face images to which the input face image will be compared later for face recognition.

Figure 3:
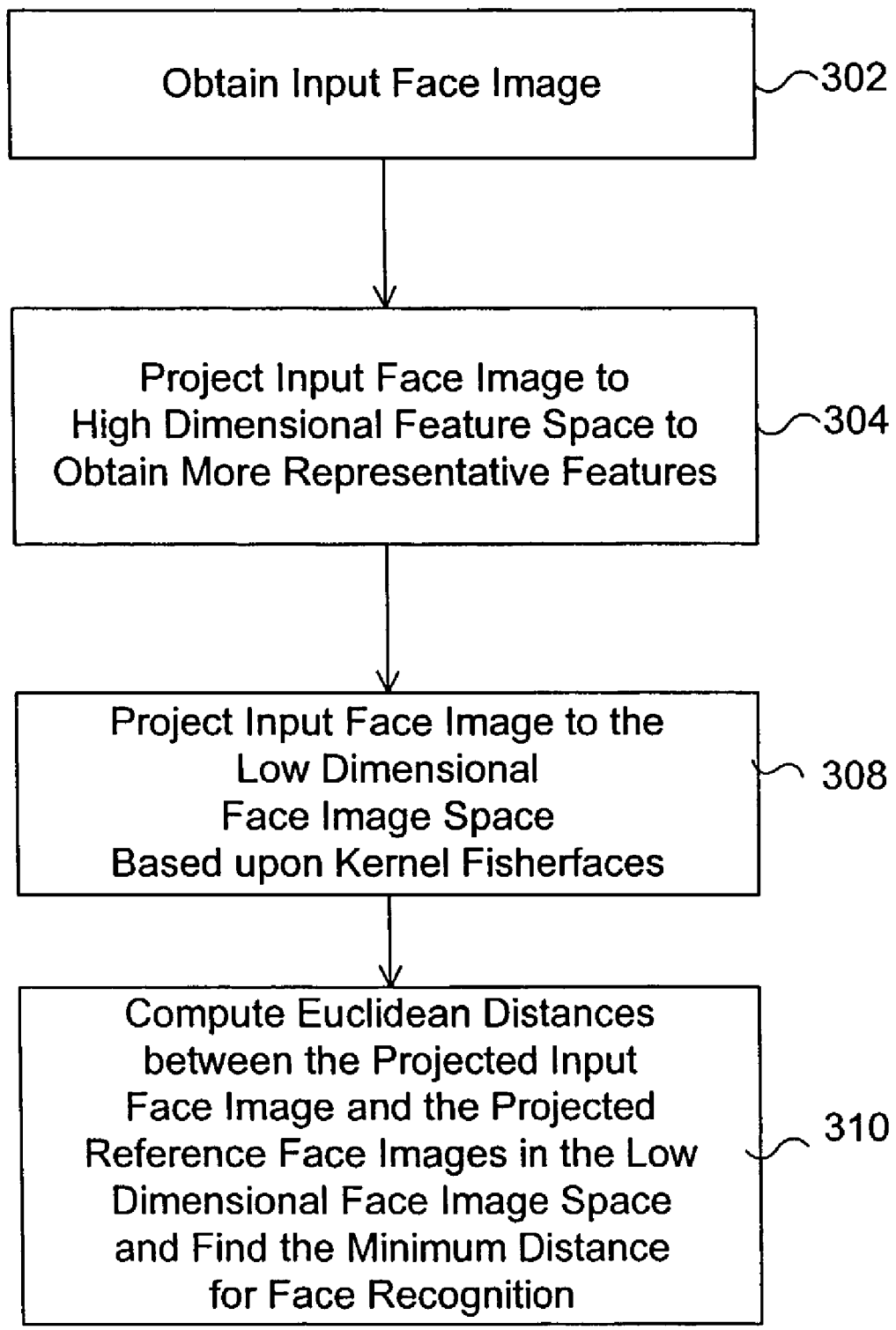
FIG. 3 is a flowchart illustrating the method of recognizing a particular face image from the set of reference face images according to one embodiment of the present invention.

FIG. 3 is a flowchart illustrating the method of recognizing a particular face image among the set of reference face images according to one embodiment of the present invention. First, an input face image 106 is obtained 302 for comparison with the previously stored reference face images 102. The input face image 106 is obtained 302 in the form of vectors in the same manner as the reference face images 102 are obtained as described above. If there is only one input face image, then the matrix 124 of vectors in the input space will be one-vector matrix (1×n matrix). The high dimensional projection module 110 projects the input face image 106 to a high dimensional feature space to obtain more representative features of the input face image 106. Subsequently, Kernel Fisherfaces previously calculated 206 with respect to the reference face images are used to project 308 the input face image to the face image space by the face image space projection module 114.

At this point, there are points (corresponding vectors) in the projected lower dimensional face image space corresponding to the input face image 106 and the set of reference face images 102. The points (vectors) corresponding to the reference face images 102 are stored in the storage module 120 but can be retrieved by the distance calculation module 118. The distance calculation module 118 calculates 310 the Euclidean distance between the input face image point and each of the points corresponding to the reference face images 106 in the lower dimensional face image space. The distance calculation module 118 determines the shortest of the computed distances. The reference face image associated with the point corresponding to the shortest distance is the particular face image that the input face image resembles most among the reference face images, and the class identity assigned to such particular face image is the result of face recognition.

The mathematical techniques underlying each of the above-described steps will now be described in greater detail.

The Eigenvalue Problem

Typically, a face image is a two-dimensional N by N array of intensity values. The face image is represented in the multi-dimensional image space as a vector of dimension $N^2$. For example, a typical image of size 256 by 256 pixels becomes a vector of dimension 65,536, or equivalently, a point in a 65,536-dimensional image space. Likewise, a set of face images maps to a collection of points in this 65,536-dimensional image space. As explained above, the face recognition system of the present invention projects the images (input face image or reference face images) to a high dimensional feature space to extract more representative features of the image from higher order statistics among the pixels in the images. Since images of faces are similar in overall configuration, they are not randomly distributed in the image space and can be described by a low dimensional subspace. Furthermore, the set of face images belonging to the same person often forms a smaller cluster in the low dimensional subspace. In other words, the intra-person (intra-class) variations of face images of the same person are smaller than the inter-person (inter-class) variations. Using Kernel Fisher Linear Discriminant (KFLD) analysis, it is possible to identify the projection vectors that best separate the clusters in the low dimensional face image space. These projection vectors are called the Kernel Fisherfaces, and the process of calculating these Kernel Fisherfaces is equivalent to solving the basic eigenvalue problem for the images in the high dimensional feature space. However, the use of kernel functions (and thus Kernel Fisherface) provides a computationally efficient way to solve the eigenvalue problem.

Given a set of m centered (zero mean, unit variance) samples $x_k$, $x_k = [x_{k1}, x_{k2}, \ldots, x_{kn}]^T \in R^n$ ($R^n$ is the input space), FLD finds the projection directions that maximize the variance between clusters while minimizing the variance within each cluster in the projected low dimensional face image space. In other words, FLD aims to find projection directions such that the samples of the sample class are projected to form a compact cluster in the low dimensional face image space (i.e., minimizing within-class scatter $S_W$ or the variance within each cluster) while separating the clusters as far as possible (i.e., maximizing the between-class scatter $S_B$ or the variance between clusters). Thus, a vector w that maximizes the following criterion function J(w) should be found:

$$J(w) = \frac{|S_B|}{|S_W|} = \frac{|w^T S_B w|}{|w^T S_W w|} \quad (1)$$

The optimal solution that maximizes J(w) turns out to be a solution to an eigenvalue problem. The columns of an optimal w are the generalized eigenvectors that correspond to the largest eigenvalues in:

$$S_B w = \lambda S_W w \quad (2)$$

for eigenvalues $\lambda \geq 0$ and eigenvectors $w \in R^n$ (R is a real number). The within-class scatter matrix $S_w$ in the input space $R^n$ is defined by:

$$S_W = \sum_{i=1}^{c} S_i \quad (3)$$

$$S_i = \sum_{x \in X_i} (x - \mu_i)(x - \mu_i)^T \quad (4)$$

$$\mu_i = \frac{1}{n_i} \sum_{x \in X_i} x \quad (5)$$

where c is the total number of classes, $\mu_i$ is the class mean, $n_i$ is the number of samples in class i, and $x \in X_i$ means x is a vector which belongs to class i. Similarly, the between-class scatter matrix $S_B$ in the input space $R^n$ is defined by:

$$S_B = \sum_{i=1}^{c} n_i (\mu_i - \mu)(\mu_i - \mu)^T \quad (6)$$

where c is the number of classes, $\mu_i$ is the class mean, and $n_i$ is the number of samples in the class, $\mu$ is the total mean of vectors x in all classes regardless of which class they belong to, i.e., $$\mu = \frac{1}{n} \sum_{x} x$$

(n is number of samples (or vectors) in all classes, and x is a vector in any class regardless of which class it belongs to).

Projecting Images to a High Dimensional Feature Space

In Kernel FLD analysis, each vector x is projected from the input space, $R^n$, to $\Phi(x)$ in a high dimensional feature space $R^f$, by a nonlinear mapping function (projection function):

$$\Phi: R^n \rightarrow R^f, f > n \quad (7)$$

Examples of the projection function $\Phi$ are described above. The dimension f of the high dimensional feature space can be arbitrarily large. Denoting the within-class and between-class scatter matrices in the high dimensional space $R^f$ by $S_W^\Phi$ and $S_B^\Phi$, respectively, and applying FLD in the high-dimensional kernel space $R^f$, it is necessary to find eigenvalues $\lambda$ and eigenvectors $w^\Phi$ of the eigenvalue problem:

$$S_B^\Phi w^\Phi = \lambda S_W^\Phi w^\Phi \quad (8),$$

Using equations (2), (3), (4), and (5) in the high dimensional feature space $R^f$, the following equations follow:

$$S_W^\Phi = \sum_{i=1}^{c} S_i^\Phi \quad (9)$$

$$S_i^\Phi = \sum_{x \in X_i} (\Phi(x) - \mu_i^\Phi)(\Phi(x) - \mu_i^\Phi)^T \quad (10)$$

-continued $$\mu_i^\Phi = \frac{1}{n_i} \sum_{x \in X_i} \Phi(x) \quad (11)$$

$$S_B^\Phi = \sum_{i=1}^{c} n_i(\mu_i^\Phi - \mu^\Phi)(\mu_i^\Phi - \mu^\Phi)^T \quad (12)$$

where $\mu^\Phi$ is the total mean of vector $\Phi(x)$, i.e., $$\mu^\Phi = \frac{1}{n_i} \sum_x \Phi(x).$$

It follows that the optimal projection matrix $$w_{OPT}^\Phi$$

in the high dimensional space $R^f$ is:

$$w_{OPT}^\Phi = \operatorname{argmax}_{w^\Phi} \frac{|(w^\Phi)^T S_B^\Phi w^\Phi|}{|(w^\Phi)^T S_W^\Phi w^\Phi|} = [w_1^\Phi, \ldots, w_m^\Phi] \quad (13)$$

where $\{w_i^\Phi | i=1,2,\ldots,m\}$ is the set of generalized eigenvectors corresponding to the m largest generalized eigenvalues $\{\lambda_i | i=1,2,\ldots,m\}$. "arg max$_{w^\Phi}$" in equation (13) finds $w^\Phi$ that maximizes the ratio that follows arg max.

To avoid the singularity problem in computing $w^\Phi$, a small identity matrix I is added to $S_W^\Phi$ in order to make it numerically stable, according to one embodiment of the present invention. In other words, $S_W^\Phi = S_W^\Phi + \epsilon I$, where I is an identity matrix whose dimensionality is the same as $S_W^\Phi$ and $\epsilon$ is a small real number, for example 0.001 according to one embodiment of the present invention. By adding a small real number to the diagonals of the within-class scatter matrix, none of the elements on the diagonal of the within-class scatter matrix can be zero, thus eliminating singularity problems.

Calculating Kernel Fisherfaces

Consider a c-class problem (i.e., each sample belongs to one of the c classes) and let the r-th sample of class t and the s-th sample of class u be $x_{tr}$ and $x_{us}$, respectively (where class t has It samples and class u has $l_u$ samples). The kernel function can be defined as:

$$(k_{rs})_{tu} = k(x_{tr}, x_{us}) = \Phi(x_{tr}) \cdot \Phi(x_{us}) \quad (14)$$

Let K be a m×m matrix defined by the elements $$(K_{tu})_{u=1,\ldots,c}^{t=1,\ldots,c}$$

where $K_{tu}$ is a matrix composed of dot products in the high dimensional feature space $R^f$, i.e., $$K = (K_{tu})_{u=1,\ldots,c}^{r=1,\ldots,c}, \quad (15)$$

where $$K_{tu} = (k_{rs})_{s=1,\ldots,l_u}^{r=1,\ldots,l_t} \quad (16)$$

Here, $K_{tu}$ is an $l_t \times l_u$ matrix, and K is an m×m symmetric matrix. Also, matrix Z is defined:

$$Z = (Z_t)_{t=1,\ldots,c} \quad (17)$$

where $(Z_t)$ is an $l_t \times l_t$ matrix with terms all equal to $$\frac{1}{l_t},$$

i.e., Z is an m×m block diagonal matrix.

The between-class and within-class scatter matrices in the high dimensional feature space $R^f$ in equation (12) and (9), respectively, become:

$$S_B^\Phi = \sum_{i=1}^{c} l_i \mu_i^\Phi (\mu_i^\Phi)^T \quad (18)$$

$$S_W^\Phi = \sum_{i=1}^{c} \sum_{j=1}^{l_i} \Phi(x_{ij}) \Phi(x_{ij})^T \quad (19)$$

where $\mu_i^\Phi$ is the mean of class i in $R^f$, and $l_i$ is the number of samples belonging to class i. From the theory of reproducing kernels, any solution $w^\Phi \in R^f$ must lie in the span of all training samples in $R^f$, i.e., $$w^\Phi = \sum_{p=1}^{c} \sum_{q=1}^{l_p} \alpha_{pq} \Phi(x_{pq}) \quad (20)$$

It follows that the solution for (20) is obtained by solving:

$$\lambda KK\alpha = KZK\alpha \quad (21)$$

Consequently, equation (13) can be written as:

$$w_{OPT}^\Phi = \operatorname{argmax}_{w^\Phi} \frac{|(w^\Phi)^T S_B^\Phi w^\Phi|}{|(w^\Phi)^T S_W^\Phi w^\Phi|} \quad (22)$$

$$= \operatorname{argmax}_{w^\Phi} \frac{|\alpha KZK\alpha|}{|\alpha KK\alpha|}$$

$$= [w_1^\Phi, \ldots, w_m^\Phi]$$

where "arg max$_{e^\Phi}$" in equation (22) finds $w^\Phi$ that maximizes the ratio that follows arg max. The extracted eigenvector $w^\Phi = [w_1^\Phi, \ldots, w_m^\Phi]$ obtained in Equation (22) is called the Kernal Fisherface.

Projecting the Face Images to a Lower Dimensional Face Image Space

The vectors $\Phi(x)$ in the high dimensional feature space $R^f$ can now be projected to a lower dimensional face image space spanned by using the Kernel Fisherface (eigenvector) $w^\Phi$. When x is the test sample whose projection is $\Phi(x)$ in the high dimensional feature space $R^f$, the projection of $\Phi(x)$ onto the eigenvectors $w^\Phi$ becomes the nonlinear Fisher Linear Discriminant (FLD) corresponding to $\Phi(x)$:

$$w^\Phi \cdot \Phi(x) = \sum_{p=1}^{c} \sum_{q=1}^{l_p} \alpha_{pq}(\Phi(x_{pq}) \cdot \Phi(x)) = \sum_{p=1}^{c} \sum_{q=1}^{l_p} \alpha_{pq} k(x_{pq}, x) \quad (23)$$

In this manner, it is possible to extract the Fisher Linear Discriminants using the kernel function without actually carrying out the burdensome computation that results from projecting the samples to a high dimensional feature space $R^f$.

Figure 4:
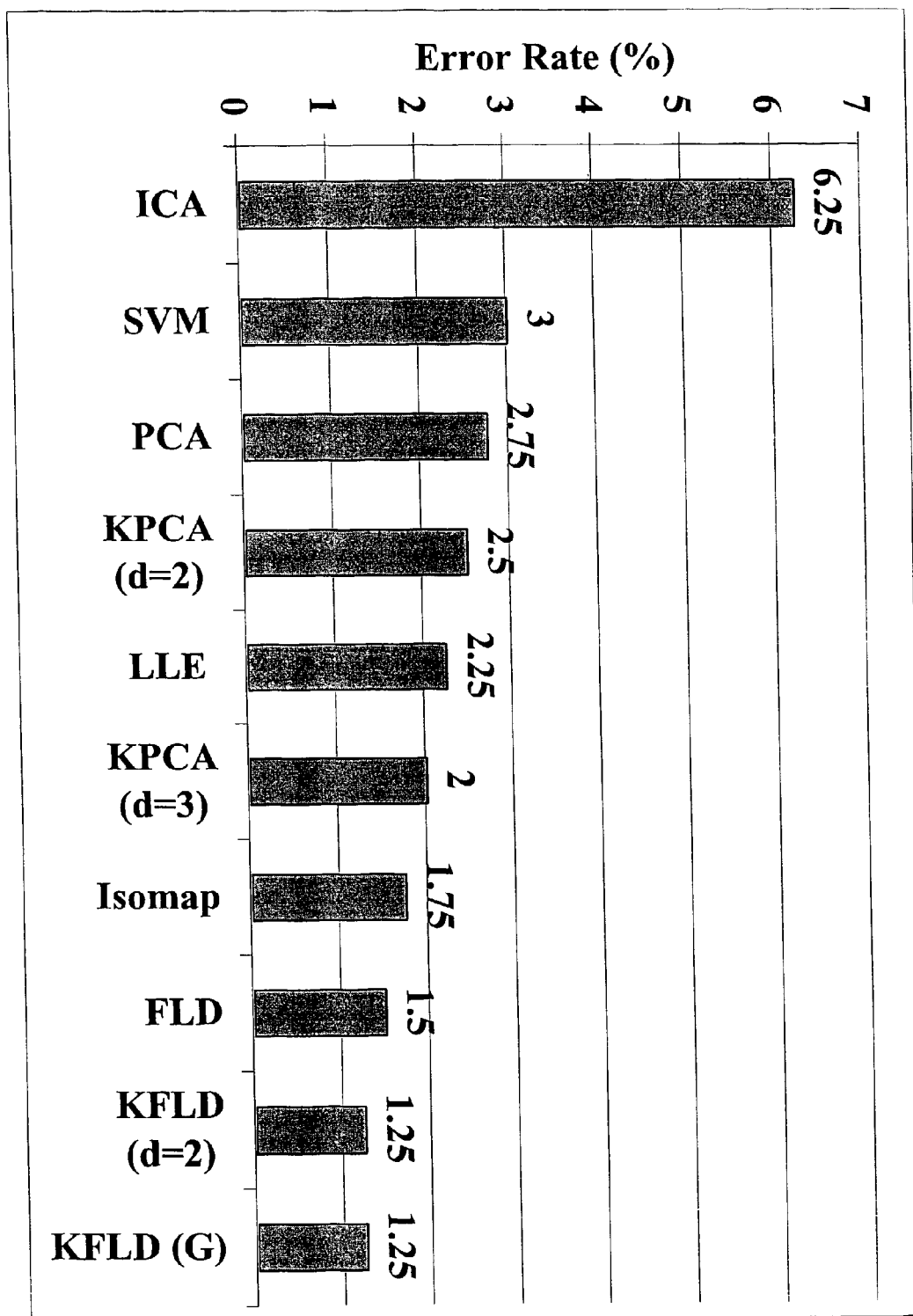
FIG. 4 is a graph illustrating the results of testing the face recognition system according to one embodiment of the present invention on a first set of test face images.

FIG. 4 is a graph illustrating the results of testing the face recognition system according to one embodiment of the present invention on a first set of test face images. The first set of test images was 400 images of 40 subjects (10 images per subject), which include facial contours and variation in pose as well as scale. However, the lighting conditions remained constant. To reduce computational complexity, each face images was down-sampled to 23×28 pixels. Each face image was represented by a raster scan of the intensity values, and then normalized to be zero-mean vectors. The mean and standard deviation of Kurtosis of the face images were 2.08 and 0.41, respectively. Kurtosis is a measure of non-Gaussianity of a distribution, is computed based on 4-th order moments and is defined by: kurt $(x) = E[x^4] - 3 (E[x^2])^2$, where E is expectation.

All tests were performed using the "leave-one-out" strategy. That is, to classify an image of a person, that image is removed from the set of m images such that there are m−1 reference face images and one input face image. The graph shows that the face recognition system using KFLD according to the present invention has the lowest error rate as compared to the error rates of face recognition systems based upon other face recognition algorithms such as ICA (Independent Component Analysis), SVM (Support Vector Machine), PCA, KPCA (Kernel Principal Component Analysis), LLE (Locally Linear Embedding), Isomap, FLD, and the like.

Figure 5:
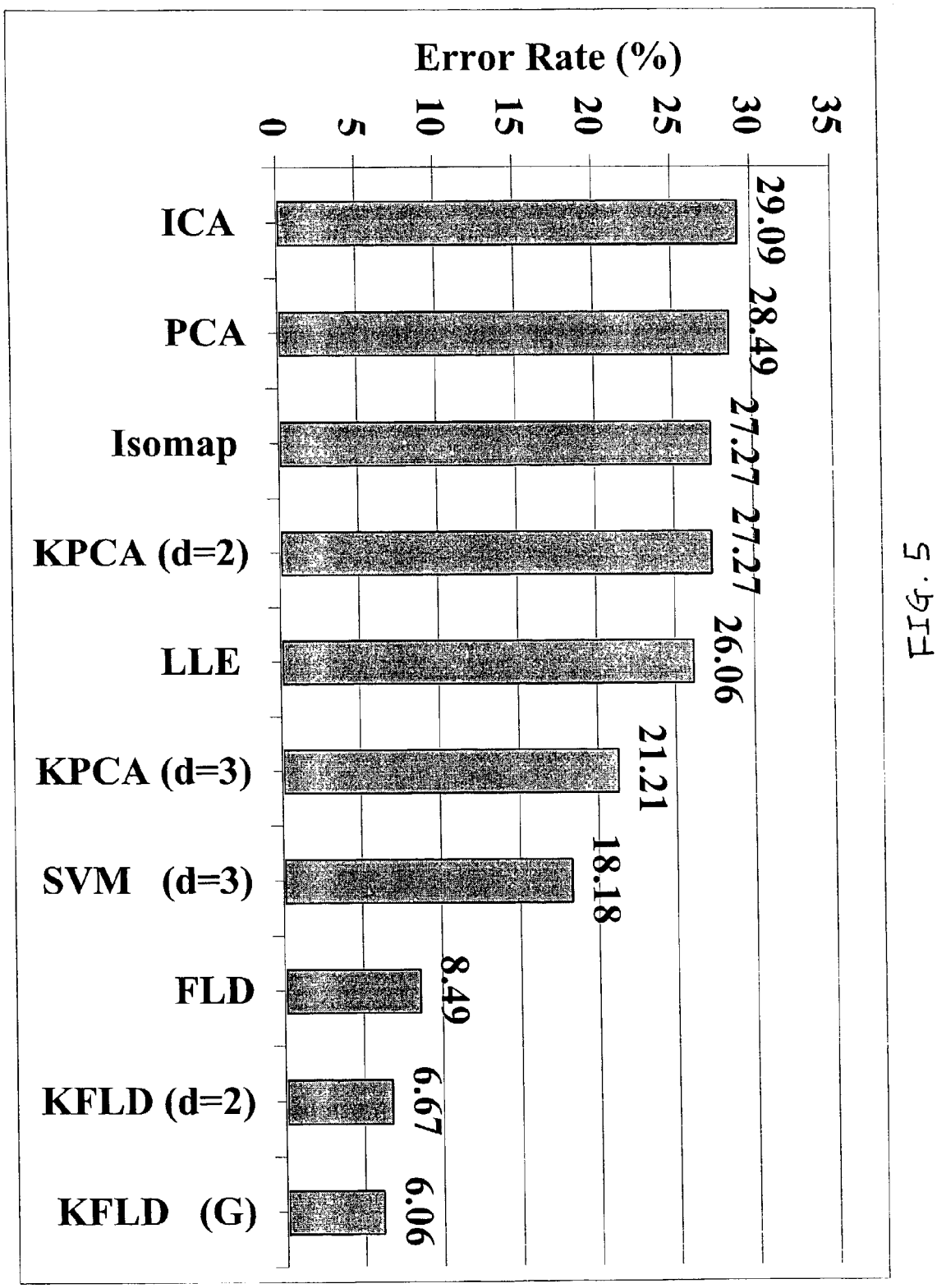
FIG. 5 is a graph illustrating the results of testing the face recognition system according to one embodiment of the present invention on a second set of test face images.

FIG. 5 is a graph illustrating the results of testing the face recognition system according to one embodiment of the present invention on a second set of test face images. The second set of test face images had 165 closely cropped images of 11 subjects that include internal facial structures such as eyebrow, eyes, nose, mouth, and chin, but do not include facial contours. For computational efficiency, each image was down-sampled to 29×41 pixels, and then represented by a centered vector of normalized intensity values. The mean and standard deviation of Kurtosis of the face images were 2.68 and 1.49, respectively.

As in FIG. 4, the tests were performed using the "leave-one-out" strategy. The graph of FIG. 5 also shows that the face recognition system using KFLD according to the present invention has the lowest error rate as compared to the error rates of face recognition systems based upon other face recognition algorithms such as ICA, SVM, PCA, KPCA, LLE, Isomap, FLD, and the like.

Although the present invention has been illustrated as a method and system for face recognition, it should be clear to one skilled in the art that the face recognition system of the present invention can be embodied in a computer program product recorded on any type of computer readable medium. The use of the face recognition system of the present invention is not limited to recognition of face images but can also be used in recognition of other complex images that have wide variation and a large amount of elements.

The present invention has been described in particular detail with respect to one possible embodiment. Those of skill in the art will appreciate that the invention may be practiced in other embodiments. First, the particular naming of the components, capitalization of terms, the attributes, data structures, or any other programming or structural aspect is not mandatory or significant, and the mechanisms that implement the invention or its features may have different names, formats, or protocols. Further, the system may be implemented via a combination of hardware and software, as described, or entirely in hardware elements. Also, the particular division of functionality between the various system components described herein is merely exemplary, and not mandatory; functions performed by a single system component may instead be performed by multiple components, and functions performed by multiple components may instead performed by a single component.

Some portions of the above description present the feature of the present invention in terms of algorithms and symbolic representations of operations on information. These algorithmic descriptions and representations are the means used by those skilled in the data processing arts to most effectively convey the substance of their work to others skilled in the art. These operations, while described functionally or logically, are understood to be implemented by computer programs. Furthermore, it has also proven convenient at times, to refer to these arrangements of operations as modules or code devices, without loss of generality.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system memories or registers or other such information storage, transmission or display devices.

Certain aspects of the present invention include process steps and instructions described herein in the form of an algorithm. It should be noted that the process steps and instructions of the present invention could be embodied in software, firmware or hardware, and when embodied in software, could be downloaded to reside on and be operated from different platforms used by real time network operating systems.

The present invention also relates to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each coupled to a computer system bus. Furthermore, the computers referred to in the specification may include a single processor or may be architectures employing multiple processor designs for increased computing capability.

The algorithms and displays presented herein are not inherently related to any particular computer or other apparatus. Various general-purpose systems may also be used with programs in accordance with the teachings herein, or it may prove convenient to construct more specialized apparatus to perform the required method steps. The required structure for a variety of these systems will appear from the description below. In addition, the present invention is not described with reference to any particular programming language. It is appreciated that a variety of programming languages may be used to implement the teachings of the present invention as described herein, and any references to specific languages are provided for disclosure of enablement and best mode of the present invention.

Finally, it should be noted that the language used in the specification has been principally selected for readability and instructional purposes, and may not have been selected to delineate or circumscribe the inventive subject matter. Accordingly, the disclosure of the present invention is intended to be illustrative, but not limiting, of the scope of the invention, which is set forth in the following claims.

I claim:

1. A method of representing a set of reference face images corresponding to a set of first vectors in an input space of a first dimension, the method comprising:
    projecting the first vectors to a high dimensional feature space of a second dimension using a projection function to generate a set of second vectors in the high dimensional feature space, the second dimension having more dimensions than the first dimension;
    generating Kernel Fisherfaces for the second vectors;
    generating a set of third vectors in a face image space of a third dimension based upon the second vectors and the Kernel Fisherfaces, the third vectors corresponding to reference face image points in the face image space and the third dimension having fewer dimensions than the first dimension and the second dimension; and
    identifying an input face image as corresponding to a particular face image in the set of reference face images, the input face image represented by at least a fourth vector in the input space, the step of identifying an input space comprising:
        projecting the fourth vector to the high dimensional feature space using the projection function to generate a fifth vector in the high dimensional feature space;
        generating a sixth vector in the face image space based upon the fifth vector and the Kernel Fisherfaces, the sixth vector corresponding to an input face image point in the face image space;
        computing the distances between the input face image point and each of the reference face image points in the face image space; and
        responsive to determining a minimum of the computed distances, identifying the input face image as corresponding to the reference face image corresponding to the minimum distance.

2. The method of claim 1, wherein the reference face images are grouped into at least two classes, the first, second, and third vectors are distributed in at least two clusters in the input space, the high dimensional feature space, and the face image space, respectively, and generating the Kernel Fisherfaces comprises:
    generating vectors that project the second vectors to the face image space such that the variance between the clusters of the third vectors is substantially maximized while the variance within each cluster of the third vectors is substantially minimized in the face image space.

3. The method of claim 2, wherein the variance between the clusters of the third vectors is represented by a between-class scatter matrix and the variance within each cluster of the third vectors is represented by a within-class scatter matrix.

4. The method of claim 3, wherein the Kernel Fisherfaces project the second vectors to the face image space such that the ratio of the between-class scatter matrix to the within-class scatter matrix is substantially maximized.

5. The method of claim 3, wherein a fraction of an identity matrix is added to the within-class scatter matrix.

6. A method of identifying an input face image as corresponding to a particular face image in a set of reference face images, the reference face images being represented by a set of first vectors and the input face image being represented by at least a second vector in an input space of a first dimension, the method comprising:
    projecting the first vectors to a high dimensional feature space of a second dimension using a projection function to generate a set of third vectors in the high dimensional feature space, the second dimension having more dimensions than the first dimension;
    generating Kernel Fisherfaces for the third vectors;
    generating a set of fourth vectors in a face image space of a third dimension based upon the third vectors and the Kernel Fisherfaces, the fourth vectors corresponding to reference face image points in the face image space and the third dimension having less dimensions than the first dimension and the second dimension;
    projecting the second vector to the high dimensional feature space using the projection function to generate a fifth vector in the high dimensional feature space;
    generating a sixth vector in the face image space based upon the fifth vector and the Kernel Fisherfaces, the sixth vector corresponding to an input face image point in the face image space;
    computing the distances between the input face image point and each of the reference face image points in the face image space; and
    responsive to determining a minimum of the computed distances, identifying the input face image as corresponding to the reference face image corresponding to the minimum distance.

7. The method of claim 6, wherein the reference face images are grouped into at least two classes, the first, third, and fourth vectors are distributed in at least two clusters in the input space, the high dimensional feature space, and the face image space, respectively, and generating the Kernel Fisherfaces comprises:
    generating vectors that project the third vectors to the face image space such that the variance between the clusters of the fourth vectors is substantially maximized while the variance within each cluster of the fourth vectors is substantially minimized in the face image space.

8. The method of claim 7, wherein the variance between the clusters of the fourth vectors is represented by a between-class scatter matrix and the variance within each cluster of the fourth vectors is represented by a within-class scatter matrix.

9. The method of claim 8, wherein the Kernel Fisherfaces project the third vectors to the face image space such that the ratio of the between-class scatter matrix to the within-class scatter matrix is substantially maximized.

10. The method of claim 8, wherein a fraction of an identity matrix is added to the within-class scatter matrix.

11. The method of claim 6, wherein the projection function satisfies the following relation:

$$k(x, y) = \Phi(x) \cdot \Phi(y)$$

where k(x,y) is a kernel function, $\Phi(x) \cdot \Phi(y)$ is the dot product of the projection functions $\Phi(x)$ and $\Phi(y)$, and x and y are real number variables.

12. The method of claim 11, wherein the kernel function is a polynomial kernel function.

13. The method of claim 11, wherein the kernel function is a Gaussian kernel function.

14. The method of claim 6, wherein generating the set of fourth vectors comprises carrying out a dot product operation between the third vectors and the Kernel Fisherfaces in the high dimensional feature space.

15. The method of claim 6, wherein generating the sixth vector comprises carrying out a dot product operation between the fifth vector and the Kernel Fisherfaces in the high dimensional feature space.

16. The method of claim 6, wherein the distances are Euclidean distances.

17. A computer program product for representing a set of reference face images corresponding to a set of first vectors in an input space of a first dimension, the computer program product stored on a computer readable medium and adapted to perform operations comprising:
 projecting the first vectors to a high dimensional feature space of a second dimension using a projection function to generate a set of second vectors in the high dimensional feature space, the second dimension having more dimensions than the first dimension;
 generating Kernel Fisherfaces for the second vectors;
 generating a set of third vectors in a face image space of a third dimension based upon the second vectors and the Kernel Fisherfaces, the third vectors corresponding to reference face image points in the face image space and the third dimension having fewer dimensions than the first dimension and the second dimension; and
 identifying an input face image as corresponding to a particular face image in the set of reference face images, the input face image represented by at least a fourth vector in the input space, the step of identifying an input space comprising:
  projecting the fourth vector to the high dimensional feature space using the projection function to generate a fifth vector in the high dimensional feature space;
  generating a sixth vector in the face image space based upon the fifth vector and the Kernel Fisherfaces, the sixth vector corresponding to an input face image point in the face image space;
  computing the distances between the input face image point and each of the reference face image points in the face image space; and
  responsive to determining a minimum of the computed distances, identifying the input face image as corresponding to the reference face image corresponding to the minimum distance.

18. The computer program product of claim 17, wherein the reference face images are grouped into at least two classes, the first, second, and third vectors are distributed in at least two clusters in the input space, the high dimensional feature space, and the face image space, respectively, and generating the Kernel Fisherfaces comprises:
 generating vectors that project the second vectors to the face image space such that the variance between the clusters of the third vectors is substantially maximized while the variance within each cluster of the third vectors is substantially minimized in the face image space.

19. The computer program product of claim 18, wherein the variance between the clusters of the third vectors is represented by a between-class scatter matrix and the variance within each cluster of the third vectors is represented by a within-class scatter matrix.

20. The computer program product of claim 19, wherein the Kernel Fisherfaces project the second vectors to the face image space such that the ratio of the between-class scatter matrix to the within-class scatter matrix is substantially maximized.

21. The computer program product of claim 19, wherein a fraction of an identity matrix is added to the within-class scatter matrix.

22. A computer program product for identifying an input face image as corresponding to a particular face image in a set of reference face images, the reference face images being represented by a set of first vectors and the input face image being represented by at least a second vector in an input space of a first dimension, the computer program product stored on a computer readable medium and adapted to perform operations comprising:
 projecting the first vectors to a high dimensional feature space of a second dimension using a projection function to generate a set of third vectors in the high dimensional feature space, the second dimension being higher than the first dimension;
 generating Kernel Fisherfaces for the third vectors;
 generating a set of fourth vectors in a face image space of a third dimension based upon the third vectors and the Kernel Fisherfaces, the fourth vectors corresponding to reference face image points in the face image space and the third dimension being lower than the first dimension and the second dimension;
 projecting the second vector to the high dimensional feature space using the projection function to generate a fifth vector in the high dimensional feature space;
 generating a sixth vector in the face image space based upon the fifth vector and the Kernel Fisherfaces, the sixth vector corresponding to an input face image point in the face image space;
 computing the distances between the input face image point and each of the reference face image points in the face image space; and
 responsive to determining a minimum of the computed distances, identifying the input face image as corresponding to the reference face image corresponding to the minimum distance.

23. The computer program product of claim 22, wherein the reference face images can be grouped into at least two classes, the first, third, and fourth vectors are distributed in at least two clusters in the input space, the high dimensional feature space, and the face image space, respectively, and generating the Kernel Fisherfaces comprises:
 generating vectors that project the third vectors to the face image space such that the variance between the clusters of the fourth vectors is substantially maximized while the variance within each cluster of the fourth vectors is substantially minimized in the face image space.

24. The computer program product of claim 23, wherein the variance between the clusters of the fourth vectors is represented by a between-class scatter matrix and the variance within each cluster of the fourth vectors is represented by a within-class scatter matrix.

25. The computer program product of claim 24, wherein the Kernel Fisherfaces project the third vectors to the face image space such that the ratio of the between-class scatter matrix to the within-class scatter matrix is substantially maximized.

26. The computer program product of claim 24, wherein a fraction of an identity matrix is added to the within-class scatter matrix.

27. The computer program product of claim 22, wherein the projection function satisfies the following relation:

$$k(x, y) = \Phi(x) \cdot \Phi(y)$$

where k(x,y) is a kernel function, $\Phi(x) \cdot \Phi(y)$ is the dot product of the projection functions $\Phi(x)$ and $\Phi(y)$, and x and y are real number variables.

28. The computer program product of claim 27, wherein the kernel function is a polynomial kernel function.

29. The computer program product of claim 27, wherein the kernel function is a Gaussian kernel function.

30. The computer program product of claim 22, wherein generating the set of fourth vectors comprises carrying out a dot product operation between the third vectors and the Kernel Fisherfaces in the high dimensional feature space.

31. The computer program product of claim 22, wherein generating the sixth vector comprises carrying out a dot product operation between the fifth vector and the Kernel Fisherfaces in the high dimensional feature space.

32. The computer program product of claim 22, wherein the distances are Euclidean distances.

33. A face recognition system for identifying an input face image as corresponding to a particular face image in a set of reference face images, the reference face images being represented by a set of first vectors and the input face image being represented by at least a second vector in an input space of a first dimension, the face recognition system comprising:
a high dimensional feature space projection module for projecting the first vectors and the second vector to a high dimensional feature space of a second dimension using a projection function to generate a set of third vectors and a fourth vector, respectively, the second dimension having more dimensions than the first dimension;
a Kernel Fisherface module for calculating Kernel Fisherfaces of the third vectors;
a face image space projection module for generating a set of fifth vectors from the third vectors and for generating a sixth vector from the fourth vector in a face image space of a third dimension using the Kernel Fisherfaces, the fifth vectors corresponding to reference face image points in the face image space and the six vector corresponding to an input face image point in the face image space and the third dimension having less dimensions than the first dimension and the second dimension; and
a distance calculation module for computing the distances between the input face image point and each of the reference face image points in the face image space.

34. The face recognition system of claim 33, further comprising a storage module for storing the Kernel Fisherfaces and the fifth vectors.

35. The face recognition system of claim 33, wherein the distance calculation module determines a minimum of the computed distances and identifies the input face image as resembling the reference face image corresponding to the minimum distance.

36. The face recognition system of claim 33, wherein the reference face images can be grouped into at least two classes, the first, third and fifth vectors are distributed in at least two clusters in the input space, the high dimensional feature space, and the face image space, respectively, and the Kernel Fisherface module calculates the Kernel Fisherfaces by finding vectors that project the third vectors to the face image space such that the variance between the clusters of the fifth vectors is substantially maximized while the variance within each cluster of the fifth vectors is substantially minimized in the face image space.

37. The face recognition system of claim 36, wherein the variance between the clusters of the fifth vectors is represented by a between-class scatter matrix and the variance within each cluster of the fifth vectors is represented by a within-class scatter matrix.

38. The face recognition system of claim 37, wherein the Kernel Fisherfaces project the third vectors to the face image space such that the ratio of the between-class scatter matrix to the within-class scatter matrix is substantially maximized.

39. The face recognition system of claim 37, wherein a fraction of an identity matrix is added to the within-class scatter matrix.

40. The face recognition system of claim 33, wherein the projection function satisfies the following relation:

$$k(x, y) = \Phi(x) \cdot \Phi(y)$$

where k(x,y) is a kernel function, $\Phi(x) \cdot \Phi(y)$ is the dot product of the projection functions $\Phi(x)$ and $\Phi(y)$, and x and y are real number variables.

41. The face recognition system of claim 40, wherein the kernel function is a polynomial kernel function.

42. The face recognition system of claim 40, wherein the kernel function is a Gaussian kernel function.

43. The face recognition system of claim 33, wherein the set of fifth vectors is generated by carrying out a dot product operation between the third vectors and the Kernel Fisherfaces in the high dimensional feature space.

44. The face recognition system of claim 33, wherein the sixth vector is generated by carrying out a dot product operation between the fourth vector and the Kernel Fisherfaces in the high dimensional feature space.

45. The face recognition system of claim 33, wherein the distances are Euclidean distances.

* * * * *